(12) United States Patent
Johnson et al.

(10) Patent No.: US 11,928,920 B2
(45) Date of Patent: Mar. 12, 2024

(54) METHODS AND SYSTEMS FOR PRESENTING A GAMING-RELATED MESSAGE TO A GAMER IN AN AREA PROXIMATE TO A BEACON ASSOCIATED WITH A CASINO

(71) Applicant: Video Gaming Technologies, Inc., Franklin, TN (US)

(72) Inventors: Ryan Christopher Johnson, Nolensville, TN (US); Lawrence Acosta Hysler, III, Hendersonville, TN (US)

(73) Assignee: VIDEO GAMING TECHNOLOGIES, INC., Franklin, TN (US)

( * ) Notice: Subject to any disclaimer, the term of this patent is extended or adjusted under 35 U.S.C. 154(b) by 0 days.

(21) Appl. No.: 18/154,589

(22) Filed: Jan. 13, 2023

(65) Prior Publication Data

US 2023/0154277 A1 May 18, 2023

Related U.S. Application Data

(63) Continuation of application No. 17/143,813, filed on Jan. 7, 2021, now Pat. No. 11,574,519, which is a
(Continued)

(51) Int. Cl.
*H04L 51/222* (2022.01)
*G07F 17/32* (2006.01)
*H04W 4/80* (2018.01)

(52) U.S. Cl.
CPC ...... *G07F 17/3225* (2013.01); *G07F 17/3218* (2013.01); *G07F 17/3223* (2013.01);
(Continued)

(58) Field of Classification Search
CPC ... H04W 4/80; G01S 5/14; G01S 1/00; H04L 67/12; H04L 51/222; G07F 17/3225;
(Continued)

(56) References Cited

U.S. PATENT DOCUMENTS 7,024,207 B2 4/2006 Gorday
8,335,524 B2 12/2012 Shutter
(Continued)

OTHER PUBLICATIONS

PCT Foreign Search Report and Written Opinion for related application PCT/US15/1342 dated Dec. 18, 2015; 7 pp.
(Continued)

*Primary Examiner* — Idriss N Alrobaye
*Assistant Examiner* — Richard B Franklin
(74) *Attorney, Agent, or Firm* — Armstrong Teasdale LLP

(57) ABSTRACT

A server system for electronic games includes a memory and a processor configured to execute instructions stored in the memory. When the instructions are executed, the instructions cause the processor to receive from a communication device, a plurality of first signals generated in response to the communication device entering one or more predefined zones associated with the electronic games, and generate, based on the plurality of first signals, a heat map that defines one or more cells based upon a magnitude of a data element of the first signals.

20 Claims, 7 Drawing Sheets

Related U.S. Application Data continuation of application No. 16/195,514, filed on Nov. 19, 2018, now Pat. No. 10,896,570, which is a continuation of application No. 14/493,909, filed on Sep. 23, 2014, now Pat. No. 10,157,518.

(52) U.S. Cl.
CPC ........ *G07F 17/323* (2013.01); *G07F 17/3239* (2013.01); *H04L 51/222* (2022.05); *H04W 4/80* (2018.02)

(58) Field of Classification Search
CPC ............. G07F 17/3218; G07F 17/3223; G07F 17/323; G07F 17/3239
See application file for complete search history.

(56) References Cited

U.S. PATENT DOCUMENTS

| | | | |
|---|---|---|---|
| 8,438,175 B2 | 5/2013 | Papke | |
| 8,456,324 B2 | 6/2013 | Tsuda | |
| 8,718,620 B2 | 5/2014 | Rosenblatt | |
| 8,958,455 B2 | 2/2015 | Lacatus | |
| 9,204,251 B1 | 12/2015 | Mendelson | |
| 9,607,474 B2 * | 3/2017 | Nguyen | G07F 17/326 |
| 2003/0064782 A1 | 4/2003 | Beaulieu | |
| 2006/0252530 A1 | 11/2006 | Oberberger | |
| 2007/0188318 A1 | 8/2007 | Cole | |
| 2011/0306400 A1 | 12/2011 | Nguyen | |
| 2012/0094769 A1 | 4/2012 | Nguyen | |
| 2013/0006773 A1 | 1/2013 | Lutnick | |
| 2013/0079134 A1 | 3/2013 | Walker | |
| 2013/0196756 A1 | 8/2013 | Nguyen | |
| 2014/0136312 A1 | 5/2014 | Saksena | |
| 2016/0027080 A1 | 1/2016 | Todasco | |
| 2016/0086436 A1 | 3/2016 | Johnson | |
| 2016/0349352 A1 | 12/2016 | Karani | |

OTHER PUBLICATIONS

International Preliminary Report on Patentability for International Application No. PCT/US2015/051342, dated Mar. 28, 2017, 6 pages.
Australian Examination Report for App No. 2015321561, dated Apr. 22, 2020, 3 pages.
Notice of Allowance dated Sep. 16, 2020 for U.S. Appl. No. 16/195,514 (pp. 1-7).
Office Action (Final Rejection) dated Sep. 14, 2022 for U.S. Appl. No. 17/143,813 (pp. 1-10).
Office Action (Notice of Allowance and Fees Due (PTOL-85)) dated Nov. 18, 2022 for U.S. Appl. No. 17/143,813 (pp. 1-8).

* cited by examiner

METHODS AND SYSTEMS FOR PRESENTING A GAMING-RELATED MESSAGE TO A GAMER IN AN AREA PROXIMATE TO A BEACON ASSOCIATED WITH A CASINO

CROSS-REFERENCE TO RELATED APPLICATIONS

This application is a continuation of and claims priority to U.S. patent application Ser. No. 17/143,813, filed Jan. 7, 2021, which is a continuation of U.S. patent application Ser. No. 16/195,514, now U.S. Pat. No. 10,896,570, filed Nov. 19, 2018, which is a continuation of U.S. patent application Ser. No. 14/493,909, now U.S. Pat. No. 10,157,518, filed Sep. 23, 2014, each of which is incorporated herein by reference in its entirety.

BACKGROUND

The field of the disclosure relates generally to communication devices, and, more particularly, to methods and systems for presenting a targeted gaming-related message to a gamer associated with a communication device.

At least some known casinos have player rewards cards that track a player's game-playing history within a casino. The game-player history enables the casino and/or a game provider to generate customized messages to at least some players. However, not all games within a casino require a player rewards card and, thus, much of the information collected by the casino and/or the game provider is incomplete.

BRIEF SUMMARY

In one embodiment, a server system for electronic games includes a memory and a processor configured to execute instructions stored in the memory. When the instructions are executed, the instructions cause the processor to receive from a communication device, a plurality of first signals generated in response to the communication device entering one or more predefined zones associated with the electronic games, and generate, based on the plurality of first signals, a heat map that defines one or more cells based upon a magnitude of a data element of the first signals.

In another aspect, a method for displaying information associated with a plurality of electronic games is provided. The method includes receiving from a communication device, a plurality of first signals generated in response to the communication device entering one or more predefined zones associated with the electronic games, generating, based on the plurality of first signals, a heat map that defines one or more cells based upon a magnitude of a data element of the first signals; and causing the heat map to be displayed on an electronic display device.

In yet another aspect, a non-transitory computer readable storage media is provided. The computer readable storage media stores instructions that, when executed by a processor cause the processor to receive from a communication device, a plurality of first signals generated in response to the communication device entering one or more predefined zones associated with the electronic games, and generate, based on the plurality of first signals, a heat map that defines one or more cells based upon a magnitude of a data element of the first signals.

BRIEF DESCRIPTION OF THE DRAWINGS

FIG. 1 is a schematic diagram of an example gaming machine;

FIG. 2 is a schematic block diagram of an example gaming system including a plurality of gaming machines shown in FIG. 1 and at least one communication device;

FIG. 3 is a schematic diagram of an example casino including a plurality of transmitters and a communication device;

FIG. 4 is an example heat map that may be generated based on information collected from the use of the transmitters and/or communication device shown in FIG. 3;

FIG. 5 is a schematic block diagram of an example computer system;

FIG. 6 is a flowchart of an example method for presenting a targeted message on the communication device shown in FIG. 4 using the computer system shown in FIG. 5; and FIGS. 7-9 are example screenshots of targeted messages presented on the communication device shown in FIG. 4 using the computer system shown in FIG. 5.

Figure 1:
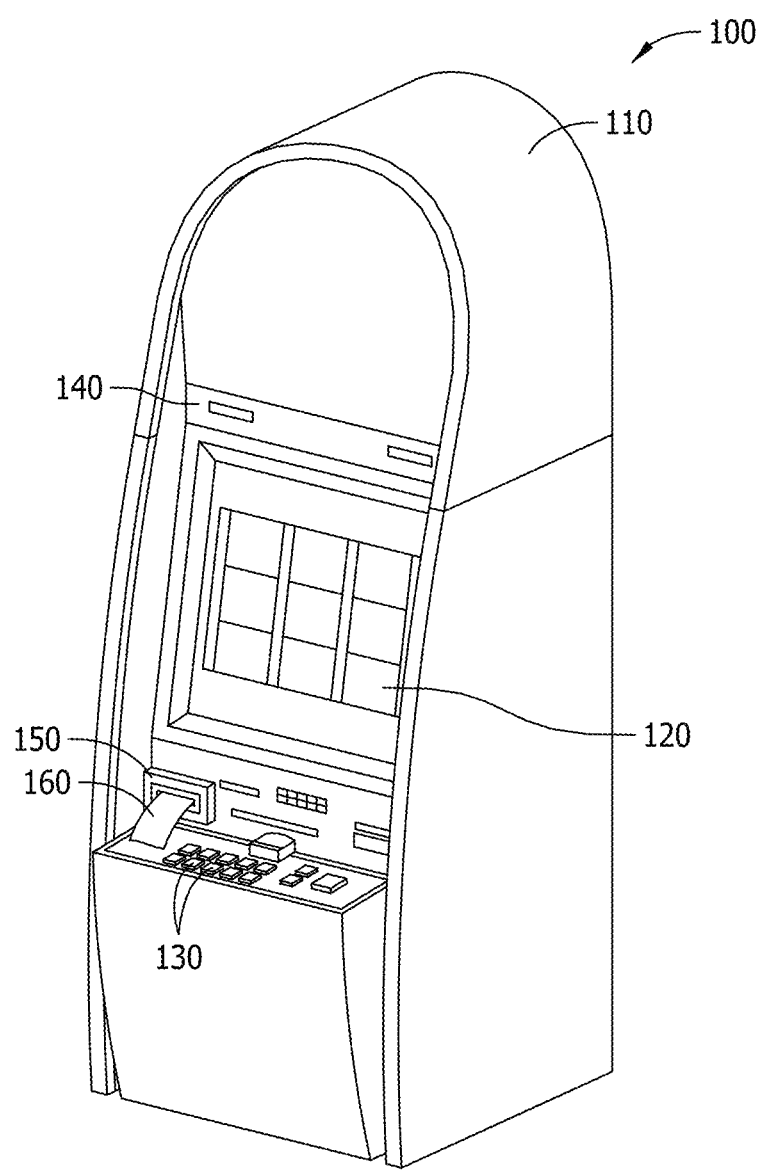
FIGS. 1-9 show example embodiments of the method and system described herein.

Although specific features of various embodiments may be shown in some drawings and not in others, such illustrations are for convenience only. Any feature of a drawing may be referenced and/or claimed in combination with any feature of any other drawing. Corresponding reference characters indicate corresponding parts throughout the several views of the drawings.

DETAILED DESCRIPTION

Example embodiments of systems and methods for use in presenting a gaming-related message to a gamer in an area proximate to a beacon associated with a casino are described herein. In one embodiment, the communication device includes a sensor configured to receive a signal from a beacon, and a computing device programmed to determine a plurality of parameters associated with the communication device based on the signal, and determine a message for presentation on the communication device based on at least one of the plurality of parameters.

The methods and systems described herein may be implemented using computer programming or engineering techniques including computer software, firmware, hardware, or any combination or subset thereof, wherein the technical effects may be achieved by performing at least one of the following steps: (a) uniquely identifying a beacon; (b) determining a plurality of parameters associated with a communication device; (c) determining a triggering event; (d) adjusting a footprint associated with a zone; (e) generating a user profile; (f) generating a heat map; (g) identifying a previous message presented on the communication device; (h) determining a message for presentation on the communication device; (i) generating a user interface for the communication device; and (j) presenting the message on the user interface.

The following detailed description illustrates embodiments of the disclosure by way of example and not by way of limitation. It is contemplated that the disclosure has application to communication methods and systems, in general, to facilitate engaging users, enhancing branding, and/or promoting products and/or services.

An element or step recited in the singular and preceded with the word "a" or "an" should be understood as not excluding plural elements or steps unless such exclusion is explicitly recited. Moreover, references to an "example embodiment" or "one embodiment" are not intended to be interpreted as excluding the existence of additional embodiments that also incorporate the recited features.

FIG. 1 is a schematic diagram of an example gaming machine 100. Gaming machine 100 may be any type of gaming machine and may include, without limitation, different structures than those shown in FIG. 1. Moreover, gaming machine 100 may employ different methods of operation than those described below.

In the example embodiment, gaming machine 100 includes a cabinet 110 configured to house a plurality of components, such as a gaming machine controller, peripheral devices, presentation devices, and player interaction devices. For example, in the example embodiment, gaming machine 100 includes a plurality of input devices, such as a touch screen (e.g., presentation device 120) and switches and/or buttons 130 that are coupled to a front 140 of cabinet 110.

In the example embodiment, presentation device 120 is used to display one or more game images, symbols, and/or indicia such as a visual representation or exhibition of movement of an object (e.g., a mechanical, virtual, or video reel), dynamic lighting, video images, and the like. In an alternative embodiment, presentation device 120 displays images and indicia using mechanical means. For example, presentation device 120 may include an electromechanical device, such as one or more rotatable reels, to display a plurality of game or other suitable images, symbols, or indicia.

Buttons 130 may include a "Bet One" button that enables the player to place a bet or to increase a bet, a "Bet Max" button that enables the player to bet a maximum permitted wager, a "Cash Out" button that enables the player to receive a cash payment or other suitable form of payment such as a ticket or voucher, which corresponds to a number of remaining credits, a "Spin" button that enables rotation of physical or simulated reels of the slot machine, and/or a "Hold" button (e.g., in video poker) for designating a card to be held in a draw poker game.

In the example embodiment, gaming machine 100 includes an input/output (I/O) device 150 coupled to front 140 for accepting and/or validating cash bills, coupons, tickets and/or vouchers 160. I/O device 150 may also be capable of printing coupons, tickets and/or vouchers 160. Furthermore, in some embodiments, I/O device 150 includes a card reader or validator for use with credit cards, debit cards, identification cards, and/or smart cards. The cards accepted by I/O device 150 may include a magnetic strip and/or a preprogrammed microchip that includes a player's identification, credit totals, and any other relevant information that may be used.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator such as a true random number generator (RNG), a pseudo-random number generator (PNG), or any other suitable randomization process.

Figure 2:
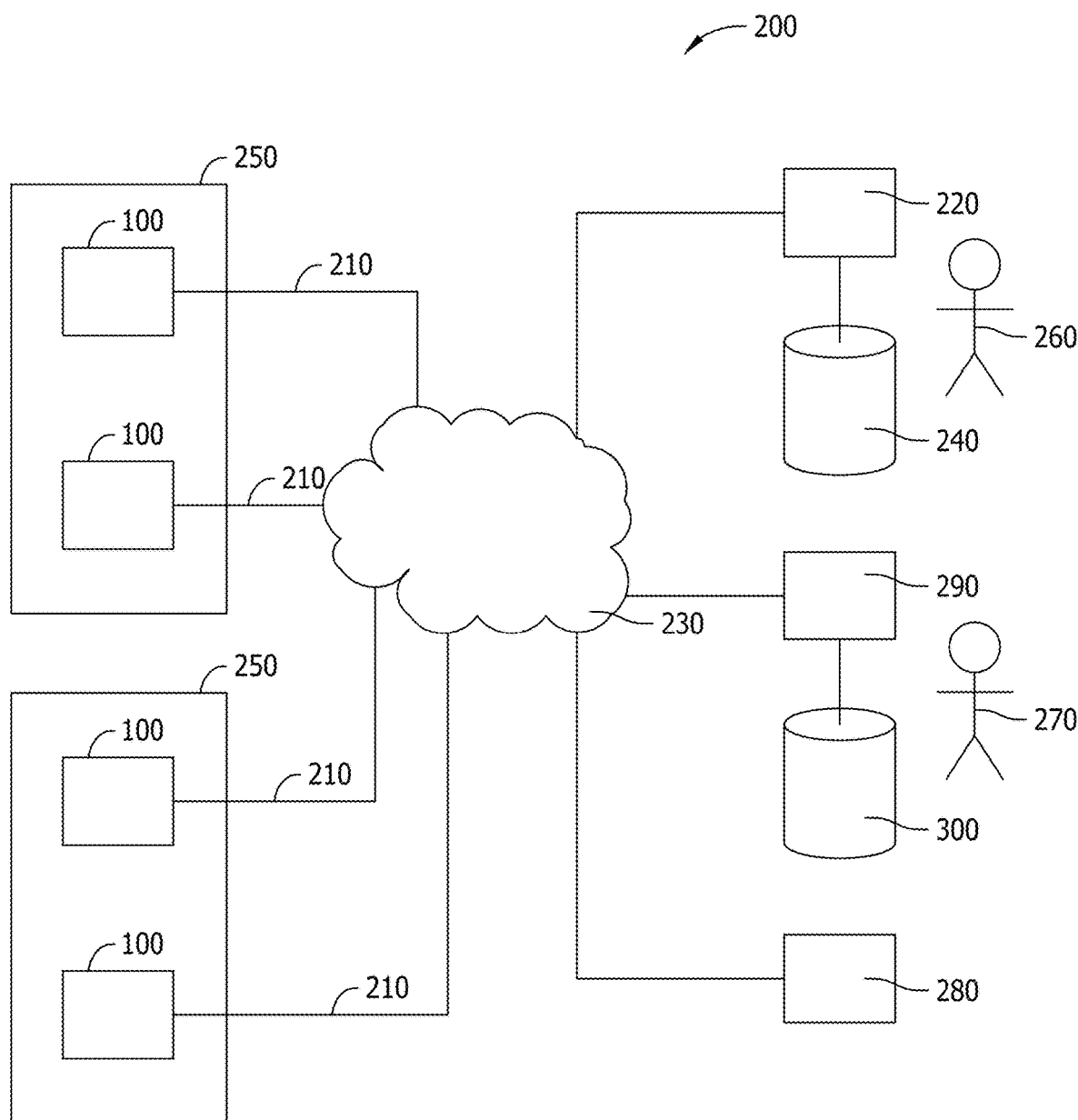

FIG. 2 is a schematic block diagram of an example gaming system 200 that includes a plurality of gaming machines 100. Each gaming machine 100 is coupled via communication interface 210 to one or more servers, such as a gaming server 220, using a network 230. Although only four gaming machines 100 are depicted, gaming system 200 may include any number of gaming system 200 that enables gaming system 200 to function as described herein. Gaming server 220 includes a processor (not shown) that facilitates data communication between each gaming machine 100 and other components of gaming system 200. Such data is stored in, for example, a memory area 240, such as a database, that is coupled to gaming server 220.

In some embodiments, gaming machines 100 are within at least one casino 250. Although only two casinos 250 are depicted, gaming system 200 may include any number of casinos 250 having any number of gaming machines 100 therein that enables gaming system 200 to function as described herein. In one embodiment, one or more gaming machines 100 may be remote gaming machines that access casino 250 over network 230. As such, a player is able to participate in a game of chance on a remote gaming machine. While gaming machines 100 are described herein as video bingo machines, video poker machines, video slot machines, and/or other similar gaming machines that implement alternative games, gaming machines 100 may also be personal computers coupled to the Internet or to a virtual private network such that a player may participate in a game of chance, remotely. In other embodiments, the player may use a cell phone or other web enabled devices coupled to a communication network to establish a connection with a particular casino 250. Moreover, gaming machines 100 may be terminal-based machines, wherein the actual games, including random number generation and/or outcome determination, are performed at gaming server 220. In such an embodiment, gaming machines 100 display results of a game via presentation device 120 (shown in FIG. 1).

In one embodiment, gaming server 220 performs a plurality of functions including, for example, game outcome generation, executing a game play event for a player, player tracking functions, and/or accounting functions to name a few. However, in alternative embodiments, gaming system 200 may include a plurality of servers that separately perform these functions and/or any suitable function for use in a network-based gaming system.

In the example embodiment, gaming system 200 includes at least one campaign manager 260 that provides and/or presents content associated with gaming machine 100 to at least one user and/or potential user 270 via a communication device 280. The term "content" refers to various types of information including documents, video files, audio files, and/or any other form of information that may be presented on communication device 280. For example, content may include greetings, instructions, maps, promotions, coupons, prompts for more information, FAQs, and/or recommendations.

In the example embodiment, campaign manager 260 generates, uploads, maintains, provides, presents, and/or otherwise processes content on one or more data processing systems 290, such as servers or embedded systems, that facilitate distribution or selective provision and recommendation of content through communication devices 280 and/or maintains one or more content repositories 300 that store content and other information. In some embodiments, data processing systems 290 receive requests from user 270 via communication device 280 and provide and/or present content to the requesting communication device 280.

"Computer systems", such as gaming server 220 and/or data processing system 290, include general computing components and/or embedded systems optimized with specific components for performing specific tasks. Examples of gaming server 220 and/or data processing system 290 include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices, and the like.

Figure 3:
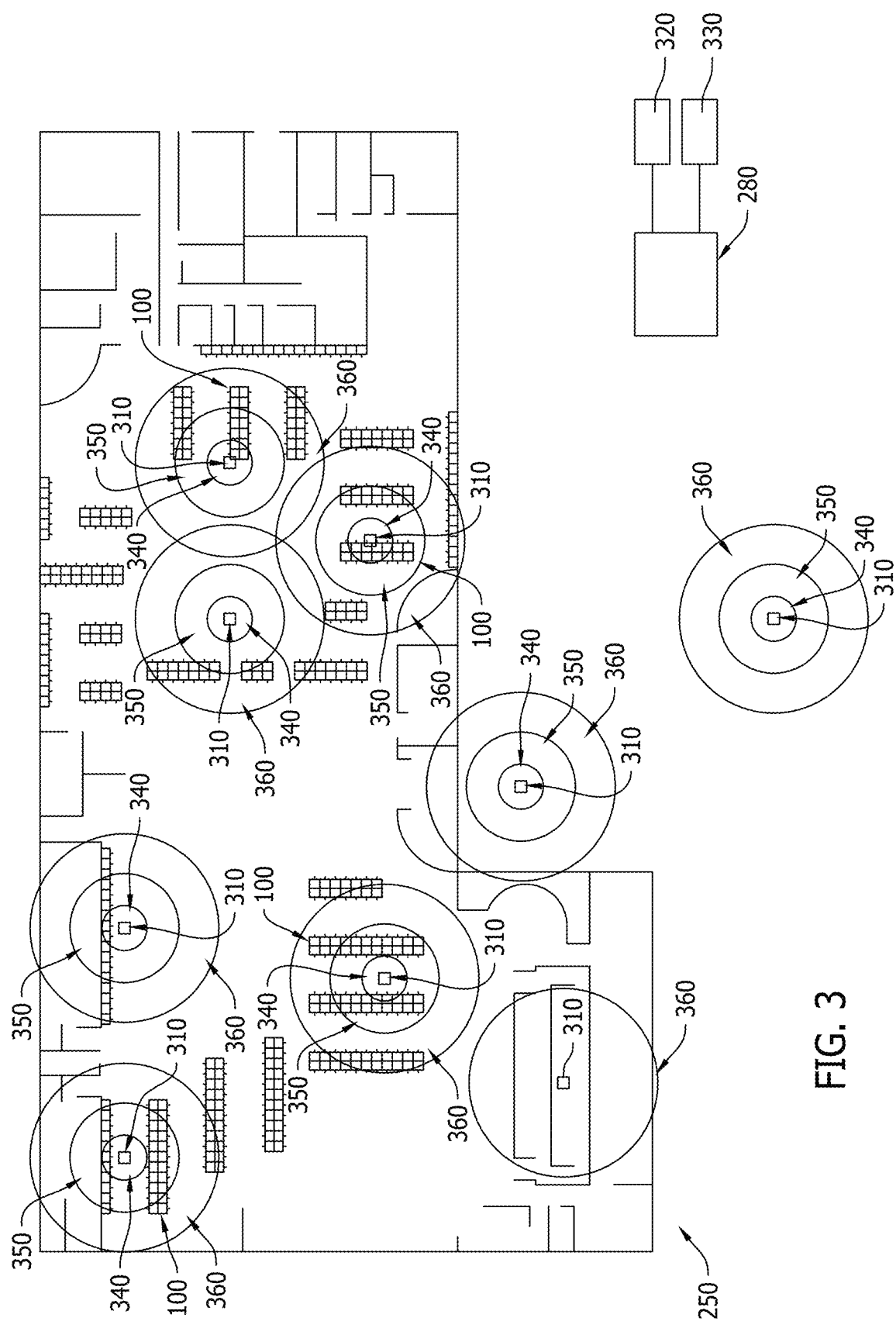

FIG. 3 is a schematic block diagram of casino 250 including a plurality of gaming machines 100 and at least one beacon or transmitter 310. In the example embodiment, each transmitter 310 is associated with a respective product and/or service, such as a gaming machine 100, a bank of gaming machines 100, or casino 250. Transmitters 310 may be in any location that enables gaming system 200 and/or casino 250 to function as described herein. For example, in the example embodiment, transmitter 310 is coupled to and/or associated with at least one gaming machine 100. Additionally or alternatively, at least one transmitter 310 is positioned remote from gaming machine 100 (e.g., in a restaurant, at a cashier booth, proximate to a restroom, and/or in the parking lot).

Each transmitter 310 is configured to transmit a signal. For example, in one embodiment, transmitter 310 is a Bluetooth® device that transmits signals to a nearby computer system equipped with a Bluetooth® receiver. (Bluetooth is a registered trademark of Bluetooth SIG, Inc., Kirkland, Washington). In one embodiment, information associated with and/or obtained from the signal is based on a reception and/or perception of the signal itself and not its makeup. In another embodiment, information associated with and/or obtained from the signal is based at least in part on the makeup of the signal (e.g., a unique identification number, a name of a casino 250, a name of a gaming machine 100, location information). In such an embodiment, information may be determined based at least in part on data coded within the signal.

In the example embodiment, communication device 280 includes a sensor 320 that is configured to detect and/or receive the signal transmitted by transmitter 310. For example, in one embodiment, communication device 280 is equipped with a Bluetooth® receiver configured to receive signals. (Bluetooth is a registered trademark of Bluetooth SIG, Inc., Kirkland, Washington). In some embodiments, communication device 280 is configured to activate upon receiving the signal. For example, in one embodiment, communication device 280 remains in a sleep, suspended, and/or standby state until the signal is detected, received, or otherwise determined that the signal has been transmitted and/or received. Alternatively, communication device 280 may be activated and/or be functioning at any time that enables communication device 280 to function as described herein.

In the example embodiment, communication device 280 is configured to determine a parameter associated with communication device 280 and/or transmitter 310 based on the signal received by sensor 320. The term "parameter" refers to any factor and/or criterion that may be used to control and/or affect an operation of communication device 280. For example, in the example embodiment, communication device 280 includes and/or is coupled to a computing device 330 programmed to determine and/or identify transmitter 310 and/or a product and/or service associated with transmitter 310 based on the signal and a predefined arrangement and/or rule set. In one embodiment, the signal has at least one distinguishing characteristic (e.g., a frequency, a tempo, a unique identification number embedded within signal) that uniquely identifies transmitter 310 from which the signal is transmitted.

In the example embodiment, computing device 330 is coupled to data processing systems 290. In some embodiments, computing device 330 receives and/or retrieves content from data processing system 290 and/or data processing system 290 transmits and/or pushes content to computing device 330. Additionally or alternatively, computing device 330 transmits information to data processing system 290 and/or data processing system 290 receives and/or retrieves content from computing device 330.

In the example embodiment, computing device 330 is programmed to determine and/or identify a zone 340, 350, or 360 associated with communication device 280 for each transmitter 310 from which a signal is received based on the signal and a predefined arrangement and/or rule set. In the example embodiment, computing device 330 is programmed to determine and/or identify whether communication device 280 is in an immediate zone 340, an intermediate zone 350, or a far zone 360 for each transmitter 310 from which a signal is received. Each transmitter 310 may have any number of zones that enables transmitter 310 and/or sensor 320 to function as described herein.

In some embodiments, computing device 330 is programmed to determine and/or identify the zone based on a relative location of communication device 280 with respect to transmitter 310. For example, in one embodiment, computing device 330 is programmed to determine a relative position and/or orientation of communication device 280 based on a signal strength, a signal frequency, and/or an angle of signal receipt. Additionally or alternatively, computing device 330 is programmed to determine an absolute geographic location (e.g., global-positioning-system information) of communication device 280. The zone may be identified using any method and/or system that enables computing device 330 to function as described herein.

Each zone is associated with a predefined footprint. In some embodiments, the footprint associated with at least one zone 340, 350, or 360 is substantially fixed relative to transmitter 310. For example, in one embodiment, immediate zone 340 includes a circle-shaped footprint extending about transmitter 310 and having an outer radius of approximately 0.5 meters (approximately 1.6 feet), near zone 350 includes a ring-shaped footprint extending about transmitter 310 and having an inner radius of approximately 0.5 meters (approximately 1.6 feet) and an outer radius of approximately 2.0 meters (approximately 6.6 feet), and far zone 360 includes a ring-shaped footprint extending about transmitter 310 and having an inner radius of approximately 2.0 meters (approximately 6.6 feet) and an outer radius of approximately 30.0 meters (approximately 98.4 feet). Alternatively, zone 340, 350, or 360 may be associated with any size footprint that enables transmitter 310 and/or sensor 320 to function as described herein.

In some embodiments, the footprint associated with at least one zone 340, 350, or 360 is adjustable relative to transmitter 310. In at least some embodiments, computing device 330 is programmed to automatically adjust a footprint of at least one zone 340, 350, or 360 based on a triggering event and/or a history of signals received from at least one transmitter 310. For example, in one embodiment, computing device 330 is programmed to automatically increase a footprint of at least one zone 340, 350, or 360 based on a predetermined time of day and/or a quantity of communication devices 280 proximate to transmitter 310. In some embodiments, computing device 330 is programmed to automatically increase a footprint of at least one zone 340, 350, or 360 when sensor 320 receives frequent, prolonged, and/or an increasing number of signals from a transmitter 310. Conversely, in at least some embodiments, computing device 330 may be programmed to automatically decrease a footprint of at least one zone 340, 350, or 360 when sensor 320 receives infrequent, intermittent, and/or a decreasing number of signals from a transmitter 310.

In the example embodiment, computing device 330 is programmed to determine and/or identify a state associated with communication device 280 for each transmitter 310 from which a signal is received based on the signal and a predefined arrangement and/or rule set. For example, in the example embodiment, computing device 330 is programmed to determine and/or identify whether communication device 280 is in an incoming state, an outgoing state, a lingering state, and an idle state for each transmitter 310 from which a signal is received. Each transmitter 310 may have any number of states that enables transmitter 310 and/or sensor 320 to function as described herein.

In some embodiments, computing device 330 is programmed to determine and/or identify the state based on a relative movement of communication device 280 with respect to transmitter 310. For example, in one embodiment, computing device 330 is programmed to determine an incoming state when computing device 330 determines and/or identifies that communication device 280 is moving towards transmitter 310 (e.g., the zone changes from far zone 360 to near zone 350 or from near zone 350 to immediate zone 340). Conversely, computing device 330 is programmed to determine an outgoing state when computing device 330 determines and/or identifies that communication device 280 is moving away from transmitter 310 (e.g., the zone changes from immediate zone 340 to near zone 350 or from near zone 350 to far zone 360). In the example embodiment, computing device 330 is programmed to determine a lingering state when computing device 330 determines and/or identifies that communication device 280 is within a particular zone 340, 350, or 360 for a predetermined period of time (e.g., ten minutes). Similarly, computing device 330 is programmed to determine an idle state when computing device 330 determines and/or identifies that communication device 280 is not within any zone 340, 350, and 360 for a predetermined period of time (e.g., one hour).

Accordingly, in the example embodiment, computing device 330 is programmed to determine and/or identify whether a predetermined period of time has elapsed since a triggering event (e.g., entering and/or leaving zone 340, 350, and/or 360). In some embodiments, computing device 330 is programmed to receive and/or retrieve a predetermined time and/or event that is independent of a triggering event. It is appreciated one skilled in the art may develop any number of rules suitable for the identification of the parameters.

In the example embodiment, computing device 330 is programmed to determine a message based at least in part on the signal and/or an associated parameter, and present the message to user 270 via communication device 280. In one embodiment, computing device 330 is programmed to identify a product and/or service, such as gaming machine 100 or casino 250, based on the signal and/or the parameter, generate a user interface based on the identification of the product and/or service, and present the message to user 270 on the user interface.

In some embodiments, computing device 330 is programmed to determine the message based at least in part on a user profile associated with user 270 and/or communication device 280. For example, in at least some embodiments, computing device 330 is programmed to monitor signals, parameters, and/or messages over a period of time, and generate a user profile including communication device-related user information based on a history of the signals, parameters, and/or messages. In such embodiments, the user profile is anonymous in that the communication device-related user information does not include user information that is specific to any particular user 270. In at least some embodiments, computing device 330 is programmed to receive user-specific user information from user 270, and generate a user profile including user-specific user information and/or supplement the user profile to include the user-specific user information. In at least some embodiments, computing device 330 is programmed to receive and/or retrieve gaming machine-related user information from gaming server 220 and/or data processing systems 290, and generate a user profile including gaming machine-related user information and/or supplement the user profile to include the gaming machine-related user information.

In some embodiments, user information includes a preferred and/or favorite gaming machine 100. In at least some embodiments, computing device 330 is programmed to determine and/or identify favorite gaming machine 100 based at least in part on user input (e.g., user 270 expressly identifies a preference for a particular gaming machine 100) and/or a history of at least one signal received from a transmitter 310 (e.g., computing device 330 may be programmed to determine and/or identify that a gaming machine 100 associated with a transmitter 310 from which sensor 320 receives frequent, prolonged, and/or an increasing number of signals is a favorite gaming machine 100). User information may include any number of favorite gaming machines 100 that enables computing device 330 to function as described herein.

In some embodiments, computing device 330 is programmed to prioritize and/or resolve a conflict or potential conflict between a plurality of signals and/or a plurality of messages. For example, in one implementation, computing device 330 is programmed to identify a message previously presented on communication device 280 and determine whether and/or when a new message is presented on communication device 280 based on the previous message. Additionally or alternatively, when sensor 320 receives and/or detects a plurality of signals from a plurality of transmitters 310, computing device 330 is programmed to determine for which signal a message is determined and/or presented on communication device 280. In some embodiments, computing device 330 is programmed to manage a frequency and/or quantity of messages presented on communication device 280. For example, in one embodiment, computing device 330 is programmed to present messages based on a predetermined time schedule (e.g., a predetermined number of messages within a predetermined period of time). In some embodiments, computing device 330 is programmed to manage content and/or type of messages presented on communication device 280. For example, in one embodiment, computing device 330 is programmed to present messages based on an associated product and/or service and/or a type of communication.

In some embodiments, computing device 330 is programmed to collect information associated with the signal, the parameters, the messages, and/or the user profile and transmit the information to data processing system 290 such that a user behavior, a popularity of gaming machine 100, and/or a success rate of a campaign associated with gaming machine 100 may be analyzed by data processing system 290. In at least some embodiments, data processing system 290 is programmed to receive and/or retrieve information from gaming server 220 to supplement the information transmitted by computing device 330.

Figure 4:
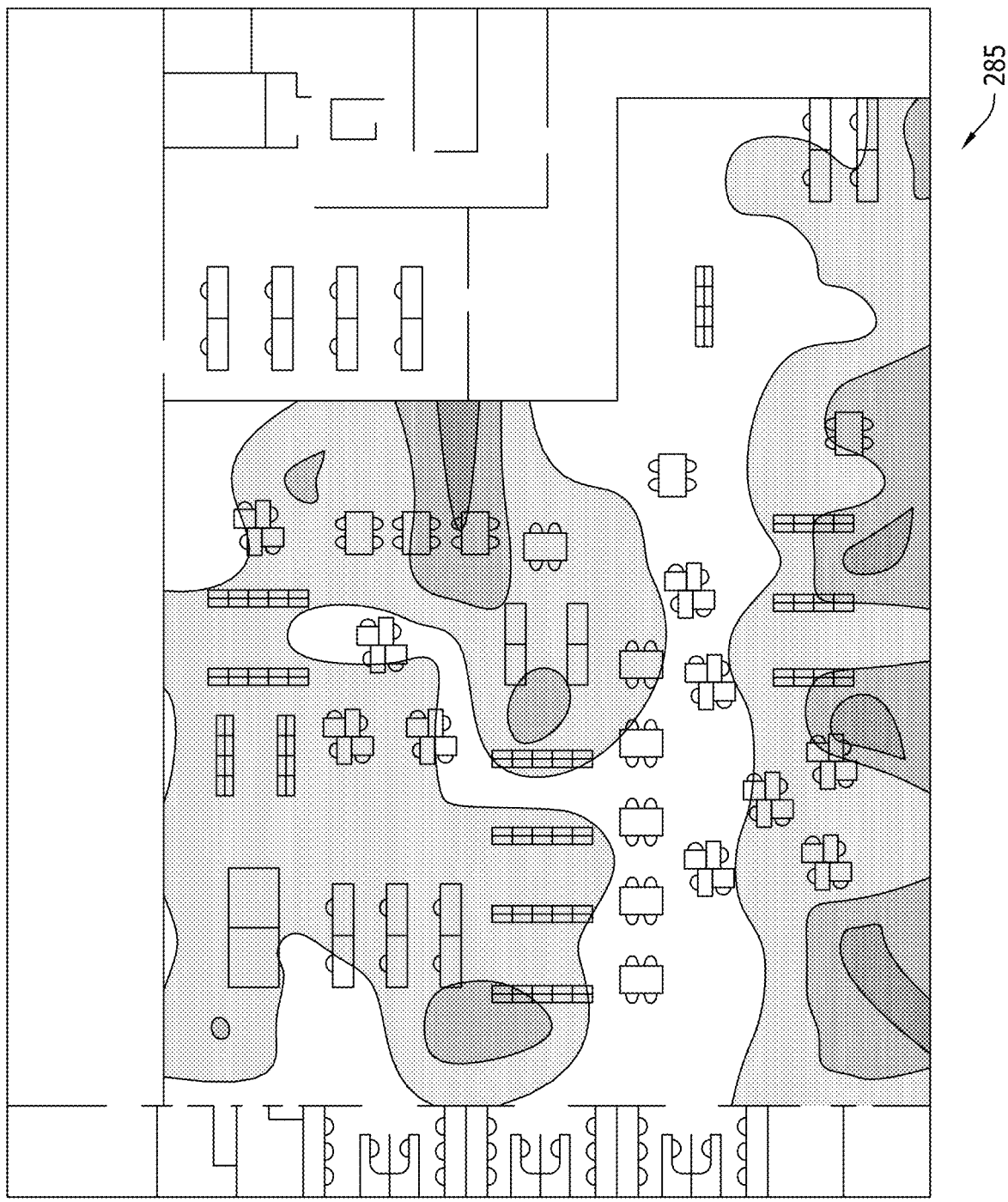

FIG. 4 is an example heat map 285 that is generated based on information collected from the use of transmitters 310 and/or communication device 280. For example, in the example embodiment, computing device 330 and/or data processing system 290 is programmed to generate heat map 285 associated with transmitter 310 and/or communication device 280 based on a history of signals, parameters (e.g., zone, state, and/or time), and/or messages. In one embodiment, the signals, parameters, and/or messages associated with at least one communication device 280 are monitored over a predetermined period of time, and computing device 330 and/or data processing system 290 generates a map that is indicative of a duration and/or frequency of at least one communication device 280 and/or a quantity of communication devices 280 at a particular location within the predetermined period of time. It is appreciated one skilled in the art may develop any number of rules suitable for the generation of heat map 285.

Figure 5:
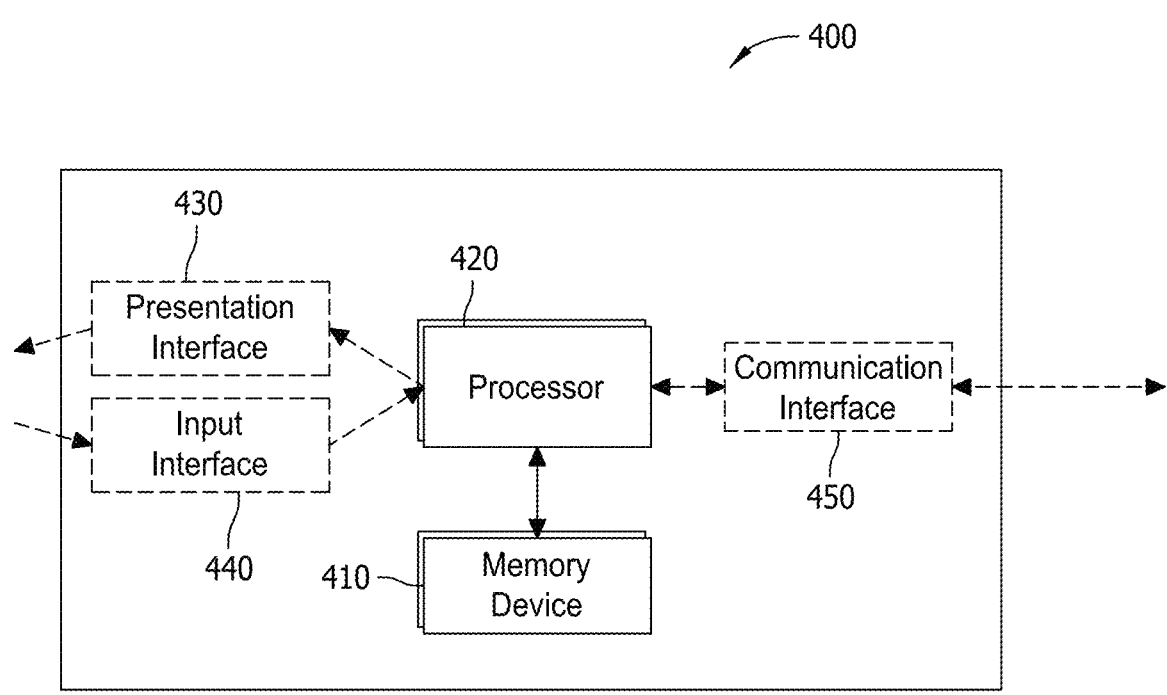

FIG. 5 is a schematic block diagram of an example computer system 400, such as gaming server 220, data processing system 290, and/or computing device 330. In the example embodiment, computer system 400 includes a memory device 410 and a processor 420 coupled to memory device 410 for use in executing instructions. More specifically, in the example embodiment, computer system 400 is configurable to perform one or more operations described herein by programming memory device 410 and/or processor 420. For example, processor 420 may be programmed by encoding an operation as one or more executable instructions and by providing the executable instructions in memory device 410.

Processor 420 may include one or more processing units (e.g., in a multi-core configuration). As used herein, the term "processor" is not limited to integrated circuits referred to in the art as a computer, but rather broadly refers to a controller, a microcontroller, a microcomputer, a programmable logic controller (PLC), an application specific integrated circuit, and other programmable circuits.

In the example embodiment, memory device 410 includes one or more devices (not shown) that enable information such as executable instructions and/or other data to be selectively stored and retrieved. In the example embodiment, such data may include, but is not limited to, content information, user profiles, gaming information, operational data, and/or control algorithms. In the example embodiment, computer system 400 is configured to automatically present a targeted message to user 270 via communication device 280. Alternatively, computer system 400 may use any algorithm and/or method that enable the methods and systems to function as described herein. Memory device 410 may also include one or more computer readable media, such as, without limitation, dynamic random access memory (DRAM), static random access memory (SRAM), a solid state disk, and/or a hard disk.

In the example embodiment, computer system 400 includes a presentation interface 430 that is coupled to processor 420 for use in presenting information to a user. For example, presentation interface 430 may include a display adapter (not shown) that may couple to a display device (not shown), such as, without limitation, a cathode ray tube (CRT), a liquid crystal display (LCD), a light-emitting diode (LED) display, an organic LED (OLED) display, an "electronic ink" display, and/or a printer. In some embodiments, presentation interface 430 includes one or more display devices.

Computer system 400, in the example embodiment, includes an input interface 440 for receiving input from the user. For example, in the example embodiment, input interface 440 receives information suitable for use with the methods described herein. Input interface 440 is coupled to processor 420 and may include, for example, a joystick, a keyboard, a pointing device, a mouse, a stylus, a touch sensitive panel (e.g., a touch pad or a touch screen), and/or a position detector. It should be noted that a single component, for example, a touch screen, may function as both presentation interface 430 and as input interface 440.

In the example embodiment, computer system 400 includes a communication interface 450 that is coupled to processor 420. In the example embodiment, communication interface 450 communicates with at least one remote device, for example gaming server 220, data processing system 290, and/or computing device 330. For example, communication interface 450 may use, without limitation, a wired network adapter, a wireless network adapter, and/or a mobile telecommunications adapter. A network (not shown) used to couple computer system 400 to the remote device may include, without limitation, the Internet, a local area network (LAN), a wide area network (WAN), a wireless LAN (WLAN), a mesh network, and/or a virtual private network (VPN) or other suitable communication means.

Figure 6:
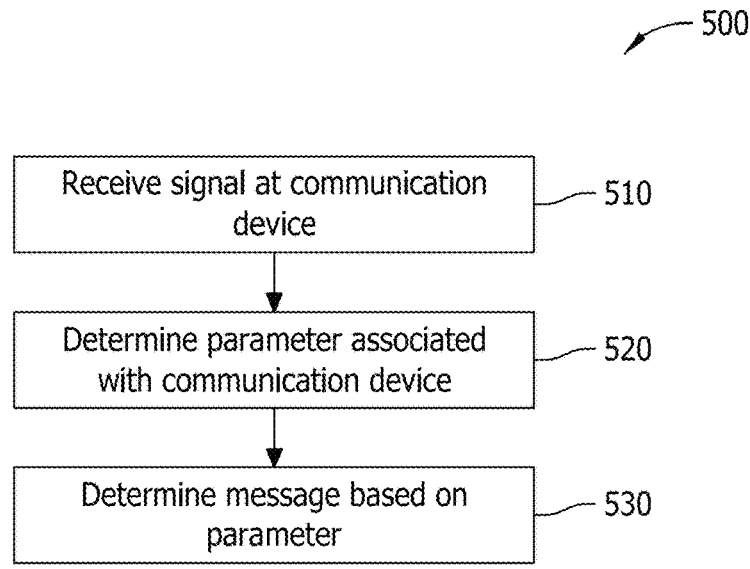

FIG. 6 is a flowchart of an example method 500 for presenting a targeted message using computer system 400. In the example embodiment, a user 270 of a communication device 280 walks into a casino 250, in which at least one transmitter 310 is associated with and/or proximate to at least one gaming machine 100 and/or within a casino environment (e.g., in a restaurant, at a cashier booth, proximate to a restroom, and/or in the parking lot). Each transmitter 310 transmits a signal and, when sensor 320 is proximate to and/or immediate transmitter 310, sensor 320 receives 510 a signal from transmitter 310. Sensor 320 may receive 510 a signal from any number of transmitters 310 that enables gaming system 200 and/or casino 250 to function as described herein. For example, in one embodiment, sensor 320 receives 510 a first signal from a first transmitter 310, and a second signal from a second transmitter 310. In some embodiments, each transmitter 310 is uniquely identifiable based on its signal.

In the example embodiment, a parameter (e.g., a unique identification number, a product and/or service, a zone a state, and/or time) associated with communication device 280 is determined 520 for each signal received 510 by sensor 320 based on a predefined arrangement and/or rule set. For example, in one embodiment, communication device 280 is associated with an immediate zone 340, a near zone 350, a far zone 360, an incoming state, an outgoing state, a lingering state, and/or an idle state based on the received signal. A parameter may be determined 520 for any number of signals that enables gaming system 200 and/or casino 250 to function as described herein. For example, in one embodiment, a first parameter associated with communication device 280 is determined 520 based on a first signal, and a second parameter associated with communication device 280 is determined 520 based on a second signal.

In the example embodiment, a message is identified and/or determined 530 for presentation via communication device 280 based on a predefined arrangement and/or rule set. More particularly, in the example embodiment, the message is generated based on the predefined arrangement and/or rule set and/or is selected from a plurality of messages based on the predefined arrangement and/or rule set. For example, in one embodiment, the message is selected from a plurality of messages stored locally at communication device 280 and/or retrieved from data processing system 290. In another embodiment, the message is generated based on a predetermined algorithm and/or logic. In yet another embodiment, at least one factor (e.g., information associated with the signal and/or parameter associated with communication device 280) is transmitted to data processing system 290, and the message is selected from a plurality of messages stored locally at content repository 300 or generated based on the at least one factor and a predetermined algorithm and/or logic, and transmitted to communication device 280 for presentation to via communication device 280.

In some embodiments, the message is determined 530 based at least in part on the received signal and/or parameter associated with communication device 280. For example, in one embodiment, when a far zone 360 and an incoming state are determined 520 based on the received signal, a "Welcome" message is determined 530 based on the parameter. In another embodiment, when an immediate zone 340 and an incoming state are determined 520 based on the received signal, a message including information about gaming machine 100 associated with transmitter 310 transmitting the received signal and/or a prompt for additional information about gaming machine 100 associated with transmitter 310 transmitting the received signal is determined 530 based on the parameter. In yet another embodiment, when no zone (i.e., sensor 320 is outside of zones 340, 350, and 360) and an outgoing state are determined 520, a "Thank You" message and/or a coupon is determined 530 based on the parameter.

In some embodiments, a message is determined 530 based at least in part on a previous signal, parameter, and/or message. For example, in one embodiment, when a "Welcome" message is determined to have been previously presented based on a previous determination 520 of a far zone 360 and an incoming state, a new "Welcome" message (e.g., "Welcome Back") is determined 530 based on a subsequent determination of subsequent determination 520 of the far zone 360 and the incoming state.

In some embodiments, sensor 320 simultaneously receives 510 a signal from each of a plurality of transmitters 310 and/or receives 510 a signal from each of a plurality of transmitters 310 within a predetermined time frame (e.g., two minutes). In such embodiments, a message is generated and/or selected based on each of the received signals, and at least one message is determined 530 for presentation from the plurality of messages. Alternatively, at least one signal is selected and/or identified from the plurality of signals, and a message is determined 530 for presentation for the selected signal. For example, in one embodiment, sensor 320 receives 510 a first signal from a first transmitter 310 associated with a first gaming machine 100 at a first time, and a second signal from a second transmitter 310 associated with a second gaming machine 100 at a second time later than the first time. In such an embodiment, a message associated with the first gaming machine 100 is determined 530 for presentation based on a timing of the respective signals based on a determination 520 of an earlier receipt of the first signal and/or a later receipt of the second signal.

In another embodiment, sensor 320 receives 510 a first signal from a first transmitter 310 associated with a first gaming machine 100, and a second signal from a second transmitter 310 associated with a second gaming machine 100 farther from communication device 280 than the first gaming machine 100. In such an embodiment, when an immediate zone 340 is determined 520 for the first gaming machine 100 and a far zone 360 is determined 520 for the second gaming machine 100, a message associated with the first gaming machine 100 is determined 530 for presentation based on a proximity of the respective gaming machines 100 to communication device 280.

In yet another embodiment, sensor 320 receives 510 a first signal from a first transmitter 310 associated with a first gaming machine 100 that communication device 280 is moving closer to, and a second signal from a second transmitter 310 associated with a second gaming machine 100 that communication device 280 is moving farther from. In such an embodiment, when an incoming state is determined 520 for the first gaming machine 100 and an outgoing state is determined 520 for the second gaming machine 100, a message associated with the first gaming machine 100 is determined 530 for presentation based on a movement of communication device 280 with respect to each gaming machine 100.

In some embodiments, a message is determined 530 for presentation based at least in part on a time threshold. For example, in one embodiment, a period of time that has elapsed after an event is monitored, and a message is determined 530 based on a signal and/or parameter associated with the most recent event. Additionally or alternatively, a message is determined 530 when triggered by a predetermined triggering time and/or event.

In some embodiments, a user profile is identified, and the message is determined 530 based at least in part on the user profile. In some embodiments, at least one predetermined preference associated with communication device 280 (e.g., frequency, number, and/or type of messages), at least one previous message presented on communication device 280, a preferred and/or favorite gaming machine 100, and/or a usage of gaming machine 100 associated with transmitter 310 transmitting the received signal is determined and/or identified. For example, in at least some embodiments, when an immediate zone 340 and a lingering state are determined 520 based on the received signal, an interaction with gaming machine 100 associated with transmitter 310 transmitting the received signal may be determined. In at least some embodiments, data processing system 290 and/or computing device 330 may communicate with gaming server 220 to determine and/or confirm whether user 270 associated with communication device 280 interacted with gaming machine 100. In such an embodiment, when a subsequent determination 520 of a far zone 360 (or near zone 350 or immediate zone 340) and an incoming state is determined 520 (i.e., it is determined that user 270 is in casino 250 and/or moving towards gaming machine 100) based on the received signal, a new message (e.g., "Would you like to return to your previous game?") is determined 530 for presentation via communication device 280.

In at least some embodiments, gaming machine 100 may be determined and/or identified as a preferred and/or favorite gaming machine 100. For example, in one embodiment, the preferred and/or favorite status of gaming machine 100 may be received from user input identifying gaming machine 100 as a preferred and/or favorite gaming machine 100. Additionally or alternatively, the preferred and/or favorite status of gaming machine 100 may be automatically determined based on a determination 520 of a frequent, prolonged, and/or continued immediate zone 340 and a lingering state. In such embodiments, a footprint of at least one zone 340, 350, or 360 associated with the preferred and/or favorite gaming machine 100 may be increased based on the preferred and/or favorite status of gaming machine 100.

In at least some embodiments, another gaming machine 100 may be recommended based at least in part on the user profile. For example, in one embodiment, when gaming machine 100 is determined and/or identified as a preferred and/or favorite gaming machine 100, another gaming machine 100 having characteristics that are similar to that of the preferred and/or favorite gaming machine 100 is determined and/or identified and the other gaming machine 100 is recommended to user 270 via communication device 280. In such an embodiment, the message may include a promotion or coupon, encouraging user 270 to interact with the recommended gaming machine 100.

In at least some embodiments, a position and/or location of gaming machine 100 and communication device 280 is determined, and guidance and/or location information is provided and/or presented to user 270 via communication device 280. For example, in some embodiments, a relative spatial location of gaming machine 100 and communication device 280 is determined based at least in part on the received signal. Additionally or alternatively, in at least some embodiments, an absolute geographic location (e.g., GPS information) of gaming machine 100 and/or communication device 280 is determined based at least in part on the received signal. In at least some embodiments, the guidance and/or location information may include relative location-based directions (i.e., directions based on a location of communication device 280, e.g., "Go straight twenty yards") and/or absolute location-based directions (i.e., directions independent of a location of communication device 280, e.g., "Go to the bank of games between the restroom and the restaurant").

In the example embodiment, the message is presented to user 270 via communication device 280 and/or any other user (e.g., a host, a manager, a waitstaff) communicatively coupled and/or having access to gaming system 200. In at least some embodiments, a user interface is generated based on the received signal, and the message is presented on the user interface. For example, in one embodiment, a gaming machine 100 and/or a casino 250 is identified based on the signal and a skin is implemented and/or used to present the messages via a presentation customized to the identified gaming machine 100 and/or casino 250.

In the example embodiment, heat map 285 (shown in FIG. 4) is generated based on a history of signals and/or parameters associated with communication device 280. In one embodiment, heat map 285 is indicative of a duration and/or frequency of communication device 280 at a particular location relative to transmitter 310 and/or a quantity of communication devices 280 at a particular location relative to transmitter 310.

In at least some embodiments, user 270 is determined to be away from gaming machine 100 and/or casino 250 when communication device 280 is associated with an idle state for a predetermined period of time (e.g., twenty-four hours). In at least some embodiments, data processing system 290 and/or computing device 330 may communicate with gaming server 220 to determine and/or confirm whether user 270 associated with communication device 280 has interacted with any gaming machine 100 within the predetermined period of time. In such an embodiment, a message inviting user 270 to come back to casino 250 and/or interact with gaming machine 100 is determined 530.

Figure 7:
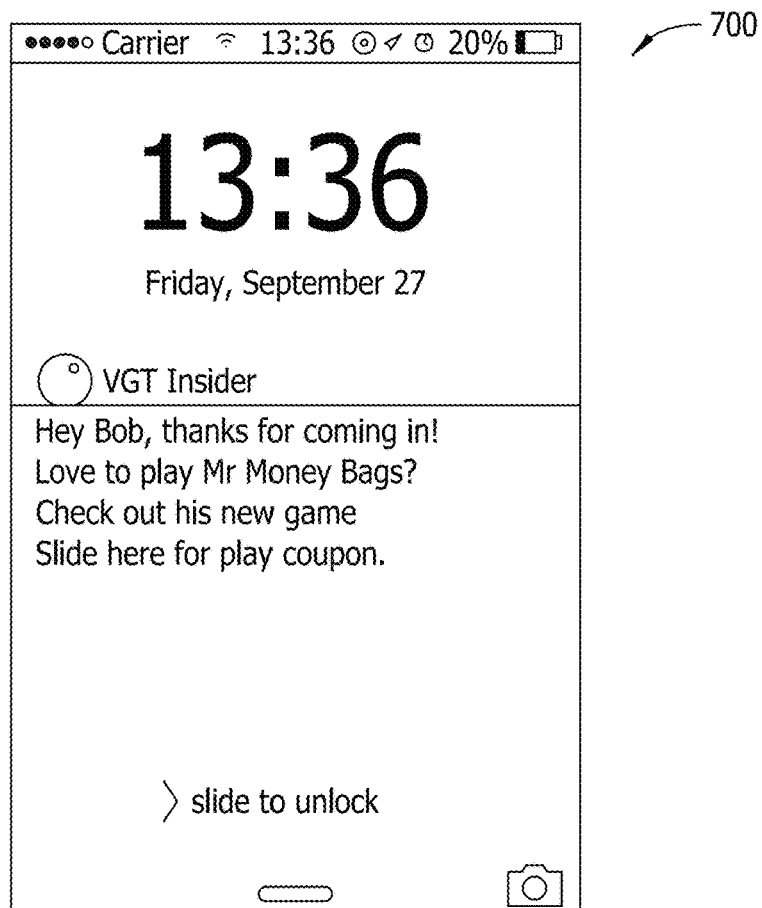
Figure 8:
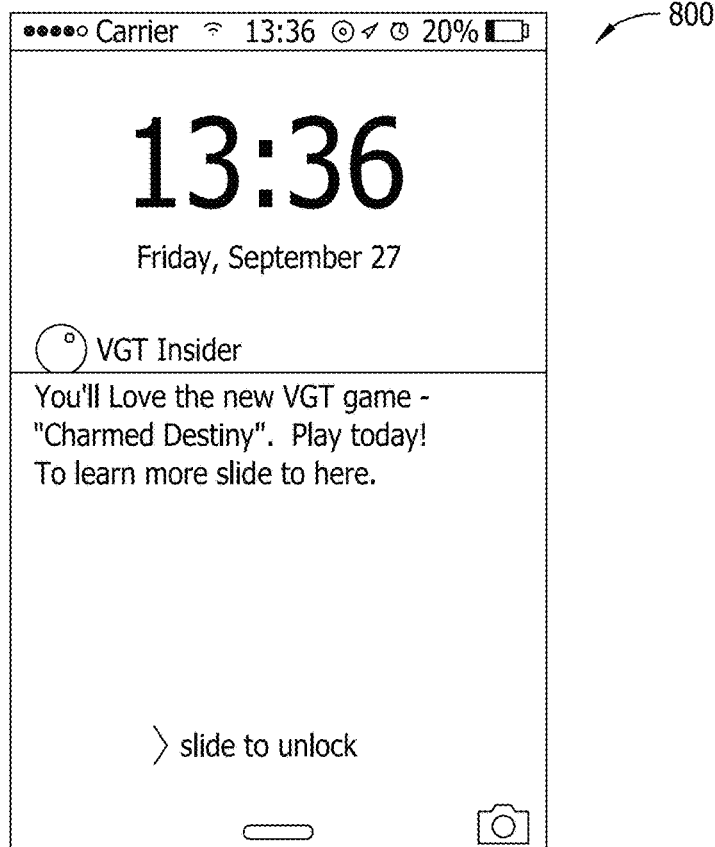
Figure 9:
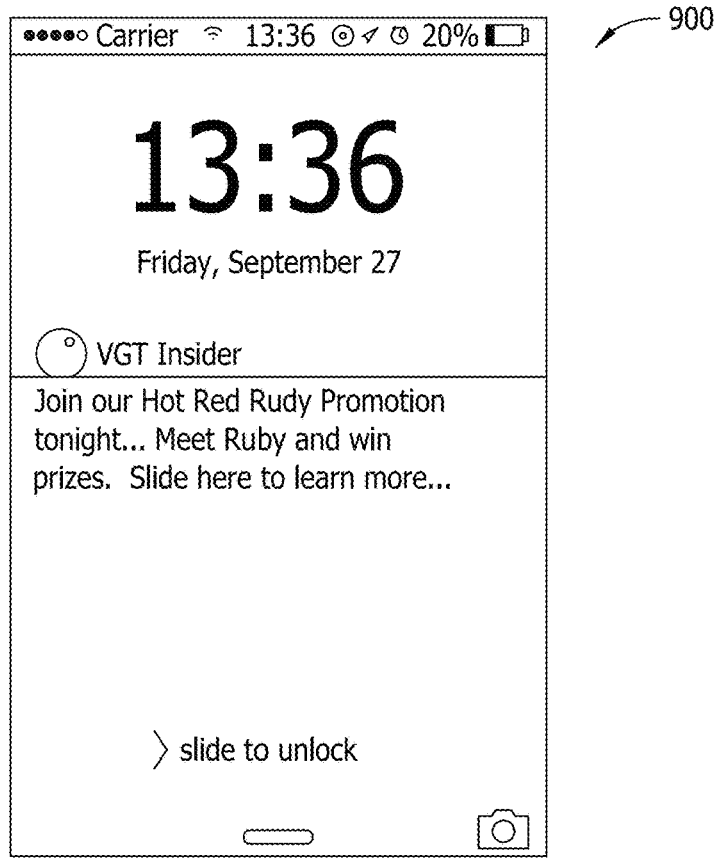

FIGS. 7-9 are example screenshots 700, 800, and 900, respectively, of messages presented on communication device 280. FIG. 7, for example, shows a screenshot 700 including a message triggered by a determination 520 of a parameter indicative of communication device 280 being proximate to and/or approaching a gaming machine 100 and/or casino 250. In the example embodiment, a message ("Hey Bob") is determined 530 based at least in part on a user profile including a user name (Bob). Moreover, in the example embodiment, a message including a recommendation and a prompt to receive and/or retrieve a coupon ("Love to play Mr Money Bags? Check out his new game. Slide here for play coupon") is determined 530 based at least in part on a user profile including a preferred and/or favorite game (Mr. Money Bags®) and/or a determination 520 of a parameter indicative of communication device 280 being proximate to and/or approaching the recommended game. (Mr. Money Bags is a registered trademark of Video Gaming Technologies, Inc., Franklin, Tennessee).

FIG. 8, for example, shows a screenshot 800 including a message triggered by a relatively new gaming machine 100 available at casino 250. In the example embodiment, a message including a recommendation and a prompt for more information ("You'll Love the new VGT game—'Charmed Destiny'. Play today! To learn more slide to here") is determined 530 based at least in part on a user profile including a preferred and/or favorite game similar to the gaming machine 100 being recommended (Charmed Destiny™) and/or a determination 520 of a parameter indicative of communication device 280 being away from relatively new gaming machine 100 and/or casino 250. (Charmed Destiny is a trademark of Video Gaming Technologies, Inc., Franklin, Tennessee).

FIG. 9, for example, shows a screenshot 900 including a message triggered by an event. In the example embodiment, a message including a recommendation and a prompt for more information ("Join our Hot Red Ruby Promotion Tonight . . . Meet Ruby and win prizes. Slide here to learn more . . . ") is determined 530 based at least in part on a user profile including a preferred and/or favorite game (Hot Red Ruby®) and/or a determination 520 of a parameter indicative of communication device 280 being proximate to and/or approaching the recommended game and/or casino 250. (Hot Red Ruby is a registered trademark of Video Gaming Technologies, Inc., Franklin, Tennessee).

One of ordinary skill in the art, guided by the teaching herein, will appreciate that one or more operations in method 500 may be performed repeatedly. For example, signals may be received repeatedly, and at least a portion of the steps described above may be performed based on each received signal.

The embodiments described herein facilitate providing real-time messages that are relevant to a current location of a communication device. The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present disclosure is described in connection with an example gaming environment, embodiments of the present disclosure are operational with numerous other general purpose or special purpose communication environments or configurations. The gaming environment is not intended to suggest any limitation as to the scope of use or functionality of any aspect of the disclosure. Moreover, the gaming environment should not be interpreted as having any dependency or requirement relating to any one or combination of components illustrated in the example operating environment.

Embodiments of the present disclosure may be described in the general context of computer-executable instructions, such as program components or modules, executed by one or more computers or other devices. Aspects of the present disclosure may be implemented with any number and organization of components or modules. For example, aspects of the present disclosure are not limited to the specific computer-executable instructions or the specific components or modules illustrated in the figures and described herein. Alternative embodiments of the present disclosure may include different computer-executable instructions or components having more or less functionality than illustrated and described herein.

The order of execution or performance of the operations in the embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

In some embodiments, the term "database" refers generally to any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California)

The present disclosure uses examples to disclose the best mode and also to enable any person skilled in the art to practice the claimed subject matter, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system comprising:
   at least one memory with instructions stored thereon; and
   at least one processor in communication with the at least one memory, wherein the instructions, when executed by the at least one processor, cause the at least one processor to:
   receive a first message from a mobile computing device, wherein the first message is associated with a first proximity between the mobile computing device and a first transmitter associated with a first electronic gaming device;
   based on the received first message,
      determine that the mobile computing device is within a first zone of a first plurality of zones associated with the first transmitter; and
      cause the first plurality of zones to change from first sizes to second sizes based on the first proximity between the mobile computing device and the first transmitter;
   receive a second message from the mobile computing device, wherein the second message is associated with a second proximity between the mobile computing device and the first transmitter, and wherein the second message is associated with a third proximity between the mobile computing device and a second transmitter associated with a second electronic gaming device;
   based on the received second message,
      determine that the mobile computing device is within a second zone of the first plurality of zones and also a first zone of a second plurality of zones associated with the second transmitter;
      cause the first plurality of zones to change from the second sizes to third sizes based on the second proximity; and
      cause the second plurality of zones to change from fourth sizes to fifth sizes based on the third proximity; and
   based on the second proximity of the mobile computing device with the first transmitter and the third proximity of the mobile computing device with the second transmitter, cause a user interface displayed on the mobile computing device to update in response to transitioning to the first zone of the second plurality of zones.

2. The electronic gaming system of claim 1, wherein the first plurality of zones decrease in footprint when the first plurality of zones change from the first sizes to the second sizes, and wherein the first plurality of zones increase in footprint when the first plurality of zones change from the second sizes to the third sizes.

3. The electronic gaming system of claim 1, wherein the second plurality of zones at least one of increase in footprint or decrease in footprint when the second plurality of zones change from the fourth sizes to the fifth sizes.

4. The electronic gaming system of claim 1, wherein the second zone of the first plurality of zones is defined around the first zone of the first plurality of zones.

5. The electronic gaming system of claim 1, wherein the instructions further cause the at least one processor to:
   determine that the mobile computing device is in an outgoing state with respect to the first transmitter based on the second message; and determine that the mobile computing device is in an incoming state with respect to the second transmitter based on the second message.

6. The electronic gaming system of claim 1, wherein the instructions further cause the at least one processor to:
generate a heat map including the first plurality of zones and the second plurality of zones based at least in part on the first message; and
update the heat map based at least in part on the second message.

7. The electronic gaming system of claim 1, wherein the instructions further cause the at least one processor to:
cause display of a first user interface on the mobile computing device based on the first message; and
cause display of a second user interface on the mobile computing device based on the second message.

8. The electronic gaming system of claim 7, wherein the instructions further cause the at least one processor to:
identify a player account associated with the mobile computing device; and
cause display of the first user interface and the second user interface further based on the player account.

9. The electronic gaming system of claim 1, wherein the instructions further cause the at least one processor to:
determine a period of time with which the mobile computing device has been in the first zone of the first plurality of zones based at least in part on the first message; and
cause the first plurality of zones to change from the first sizes to the second sizes further based on the period of time.

10. At least one non-transitory computer-readable storage medium with instructions stored thereon that, in response to execution by at least one processor, cause the at least one processor to:
receive a first message from a mobile computing device, wherein the first message is associated with a first proximity between the mobile computing device and a first transmitter associated with a first electronic gaming device;
based on the received first message,
determine that the mobile computing device is within a first zone of a first plurality of zones associated with the first transmitter based on the first message; and
cause the first plurality of zones to change from first sizes to second sizes based on the first proximity between the mobile computing device and the first transmitter;
receive a second message from the mobile computing device, wherein the second message is associated with a second proximity between the mobile computing device and the first transmitter, and wherein the second message is associated with a third proximity between the mobile computing device and a second transmitter associated with a second electronic gaming device;
based on the received second message,
determine that the mobile computing device is within a second zone of the first plurality of zones and a first zone of a second plurality of zones associated with the second transmitter based on the second message;
cause the first plurality of zones to change from the second sizes to third sizes based on the second proximity; and
cause the second plurality of zones to change from fourth sizes to fifth sizes based on the third proximity; and based on the second proximity of the mobile computing device with the first transmitter and the third proximity of the mobile computing device with the second transmitter, cause a user interface displayed on the mobile computing device to update in response to transitioning to the first zone of the second plurality of zones.

11. The at least one non-transitory computer-readable storage medium of claim 10, wherein the instructions further cause the at least one processor to:
cause display of a first user interface on the mobile computing device based on the first message; and
cause display of a second user interface on the mobile computing device based on the second message.

12. A computer-implemented method comprising:
receiving a first message from a mobile computing device, wherein the first message is associated with a first proximity between the mobile computing device and a first transmitter associated with a first electronic gaming device;
in response to receiving the first message,
determining that the mobile computing device is within a first zone of a first plurality of zones associated with the first transmitter; and
causing the first plurality of zones to change from first sizes to second sizes based on the first proximity between the mobile computing device and the at least one transmitter;
receiving a second message from the mobile computing device, wherein the second message is associated with a second proximity between the mobile computing device and the first transmitter, and wherein the second message is associated with a third proximity between the mobile computing device and a second transmitter associated with a second electronic gaming device;
in response to receiving the second message,
determining that the mobile computing device is within a second zone of the first plurality of zones and a first zone of a second plurality of zones associated with the second at least one transmitter based on the second message;
causing the first plurality of zones to change from the second sizes to third sizes based on the second proximity; and
causing the second plurality of zones to change from fourth sizes to fifth sizes based on the third proximity; and
based on the second proximity of the mobile computing device with the first transmitter and the third proximity of the mobile computing device with the second transmitter, causing a user interface displayed on the mobile computing device to update in response to transitioning to the first zone of the second plurality of zones.

13. The computer-implemented method of claim 12, wherein the first plurality of zones decrease in footprint when the first plurality of zones change from the first sizes to the second sizes, and wherein the first plurality of zones increase in footprint when the first plurality of zones change from the second sizes to the third sizes.

14. The computer-implemented method of claim 12, wherein the second plurality of zones at least one of increase in footprint or decrease in footprint when the second plurality of zones change from the fourth sizes to the fifth sizes.

15. The computer-implemented method of claim 12, wherein the second zone of the first plurality of zones is defined around the first zone of the first plurality of zones.

16. The computer-implemented method of claim 12, further comprising:

determining that the mobile computing device is in an outgoing state with respect to the first transmitter based on the second message; and determining that the mobile computing device is in an incoming state with respect to the second transmitter based on the second message.

17. The computer-implemented method of claim 12, further comprising:

generating a heat map including the first plurality of zones and the second plurality of zones based at least in part on the first message; and updating the heat map based at least in part on the second message.

18. The computer-implemented method of claim 12, further comprising:

causing display of a first user interface on the mobile computing device based on the first message; and causing display of a second user interface on the mobile computing device based on the second message.

19. The computer-implemented method of claim 12, further comprising:

identifying a player account associated with the mobile computing device; and causing display of the first user interface and the second user interface further based on the player account.

20. The computer-implemented method of claim 12, further comprising:

determining a period of time with which the mobile computing device has been in the first zone of the first plurality of zones based at least in part on the first message; and causing the first plurality of zones to change from the first sizes to the second sizes further based on the period of time.

* * * * *